No. 737,099. PATENTED AUG. 25, 1903.
C. C. HALL.
PROCESS OF MAKING MINERAL WOOL FELT.
APPLICATION FILED DEC. 20, 1902.
NO MODEL.
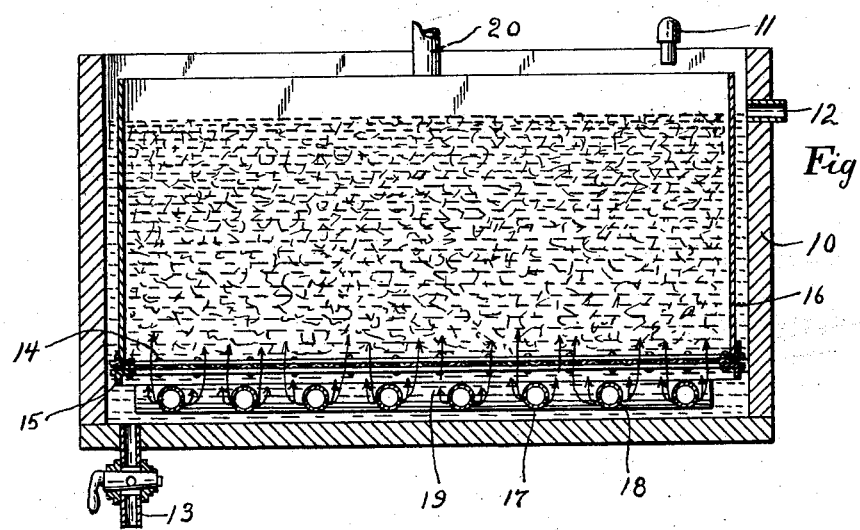
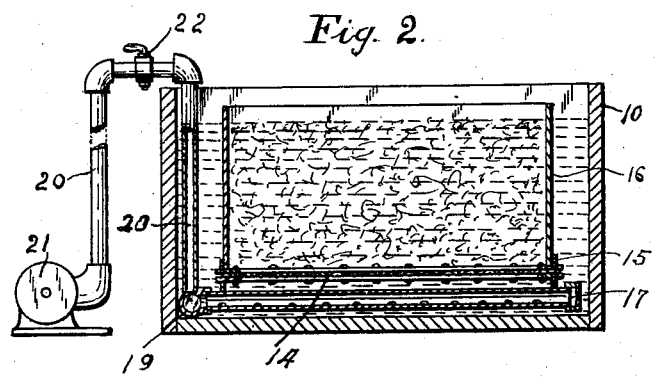
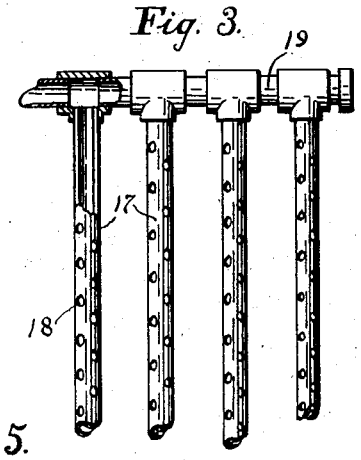
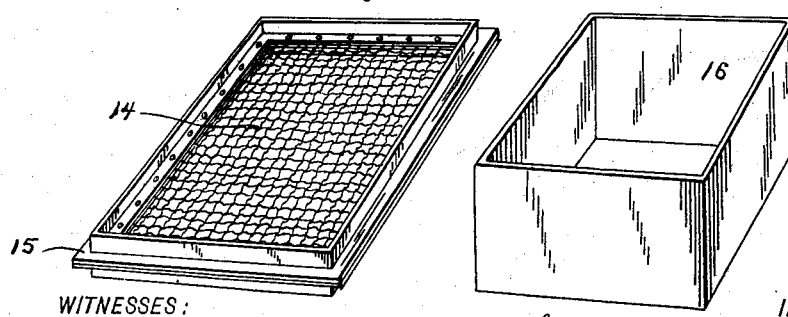
WITNESSES: H. I. Pearce, Nellie Allemong.
INVENTOR Charles C. Hall.
BY V. H. Lockwood, ATTORNEY.

No. 737,099. Patented August 25, 1903.

UNITED STATES PATENT OFFICE.

CHARLES C. HALL, OF ALEXANDRIA, INDIANA, ASSIGNOR TO AMERICAN INSULATING MATERIAL MANUFACTURING COMPANY, OF ST. LOUIS, MISSOURI, A CORPORATION OF MISSOURI.

PROCESS OF MAKING MINERAL-WOOL FELT.

SPECIFICATION forming part of Letters Patent No. 737,099, dated August 25, 1903.

Application filed December 20, 1902. Serial No. 136,068. (No specimens.)

*To all whom it may concern:*

Be it known that I, CHARLES C. HALL, of Alexandria, county of Madison, and State of Indiana, have invented a certain new and useful Process for Making Mineral-Wool Felt; and I do hereby declare that the following is a full, clear, and exact description thereof, reference being had to the accompanying drawings, in which like letters refer to like parts.

By "mineral-wool felt" is meant an article of merchandise formed of mineral wool, or rock-wool, or silicate cotton, or rock-cotton, trade names for substantially the same thing, and a suitable binding material mixed with the mineral wool, so as to form a body of material that is homogeneous and more or less compact and substantially inflexible.

By the process herein set forth a mineral-wool felt is made that is extremely porous and fibrous, that is lacking in solidity, although sufficiently compact to hold all the fibers and parts together in one body. The fibers of the ingredients, including the mineral-wool fibers, are not in any degree broken by the process, but are left their full length in the resulting product. The mineral-wool fibers are not only thus unbroken, but are thoroughly interlaced with each other, whereby they are joined and cling together like a body of cotton somewhat compressed. This is the chief object of the process and the chief virtue of the product.

The nature of the process will be understood from the following description, in connection with the accompanying drawings, of a portion of the apparatus employed in carrying out the process.

In the drawings, Figure 1 is a vertical longitudinal section through the felting-tank or tank in which the felt is finally formed. Fig. 2 is a transverse vertical section of the same. Fig. 3 is a bottom view of the air-pipes in the felting-tank. Fig. 4 is a perspective of the screen that belongs in the felting-tank. Fig. 5 is a removable box resting on the screen in the felting-tank.

What is shown in the drawings constitutes only a part of the apparatus that may be used in carrying out the process in making this product, as will appear from the following description of the process.

The first part of the process consists in making suitable binding material to combine with the mineral wool in making the felt. In a vessel of any sort there is placed boiling water, dry wood-pulp, flour, and some antiseptic salt—such as alum, borax, chlorid of mercury, and the like—in substantially the following proportions: boiling water, one hundred gallons; dry wood-pulp, forty pounds; flour, ten pounds; antiseptic salt, such as alum, &c., one pound. In this vessel said ingredients are thoroughly stirred and mixed by any suitable means. This binding material may then be allowed to cool and be used in the subsequent steps of the process as needed. The next part of the process consists in mixing the desired amount of mineral wool with water in a suitable water-tank, such as that marked 10 in the drawings. The water enters said tank through an inlet-pipe 11, and there is an overflow-pipe 12 in the upper part of the tank and a drain-pipe 13, closed by a suitable valve. In said box I place a screen 14 of about one-half-inch mesh, with its edges formed, preferably, of the angle-irons 15, said screen being readily removable. On the screen I place a galvanized-iron box 16, open at the top and the bottom, with its sides fitting immediately within the upper flanges of the angle-irons 15. The mineral wool is placed within this box 16. The next part of the process consists in forcing air diffusedly up through the mineral wool in such water-tank. This is done in what is herein shown by placing a number of pipes 17 in the bottom of the water-tank provided with perforations 18 for the outlet of the air, said pipes being connected to a header 19, which is supplied with air through the pipe 20 from the blower 21, so that the air enters with considerable force and is forced up in bubbles through the mass of mineral wool, so that it lies floating in the water. The next part of the process is to mix with the mineral wool and water in said tank the binding material heretofore described. This is done in the proportion of about twelve gallons of the binding mixture to a hundred pounds of the dry mineral wool employed. Preferably no violent means, like a beater, is employed to mix such binding material with the mineral wool and water; but this admixture is effected by the bubbles of air that are forced up through the mass. This continues but a very short time, when the air is turned off by means of the valve 22, and then by hooks or any suitable means the screen is elevated and the water drained thoroughly from the contents after the screen is removed from the box. The fibrous material settles upon the screen in a practically uniform thickness, and after the water is reasonably well drained therefrom the felt is dried in any desired way.

The purpose of the flour employed in making the product is to cause an adhesion of the particles of pulp and of the fibers of the wool, as the particles of flour going into solution and being minutely distributed adhere to the fibers of the wool and particles of pulp, whereby they tend to cling together tenaciously. Since the flour is used with boiling water, the soluble part, as the starch, goes into solution and is carried away, while the gluten remains, and it is that which forms the adhesive material. Some other form of gluten or adhesive material may be employed instead of flour for the same purpose. The use of the flour or other adhesive material enables the product to be made of sufficient rigidity and strength without pressure. The pulp constitutes the chief portion of the binding material and as such gives body to the resultant product when combined with the mineral wool. While "wood-pulp" is above referred to, any sort of pulp, paper-stock, straw-pulp, and the like may be used. In fact, any form of what is known as "paper-stock" will answer the purpose and perform substantially the function of the wood-pulp.

The function of the antiseptic salt, such as alum, is to prevent the decay of the small portion of organic matter in the felt and tends to render it incombustible.

The function of the introduction of air up through the mass of mineral wool is to agitate the water and by such slight mechanical force applied to the fibers of the wool to separate and distribute the fibers without breaking them, as would be the result of violent agitation by a beater, paddles, and the like. Another result of this method of separating and distributing the fibers of the wool is to permit the little glass particles in the mineral wool, commonly called "shot," to separate from the wool and settle in the bottom of the tank. This renders the felt lighter in weight and of more uniform density. The air-bubbles also mix the binding material with the fibers of the wool. The resulting product or felt is a very light porous fibrous body. However, the fibers adhere together, so as to give the felt permanency and adhesiveness. The fibers of the wool are preserved in the final product unbroken and are well interlaced, thus giving it the greatest possible amount of inclosed air-cells and rendering the material a high non-conductor of heat and cold.

This mineral-wool felt is used as an insulator from heat in cold-storage and other constructions.

What I claim as my invention, and desire to secure by Letters Patent, is—

1. In the process of making mineral-wool felt, forcing air diffusedly through the mineral wool to separate the fibers thereof.

2. In the process of making mineral-wool felt, placing the mineral wool in water, and forcing air diffusedly up through the water and mineral wool.

3. In the process of making mineral-wool felt, mixing mineral wool, water, and a suitable binding material and forcing air diffusedly up through said mixture.

4. The process of making mineral-wool felt which consists of the following steps: first preparing suitable binding material, second placing the mineral wool in water, third forcing air diffusedly through the mineral wool and water, fourth mixing the binding material with the mineral wool in the water, and draining and drying the resulting product.

In witness whereof I have hereunto affixed my signature in the presence of the witnesses herein named.

CHARLES C. HALL.

Witnesses:
 RUTH WALES,
 HORACE LUKENS.